Dec. 10, 1957
F. ZAPELLONI
2,815,960
DEVICE FOR NEUTRALIZING CENTRIFUGAL FORCE
IN VEHICLES WITH TWO OR MORE WHEELS
Filed Nov. 24, 1953
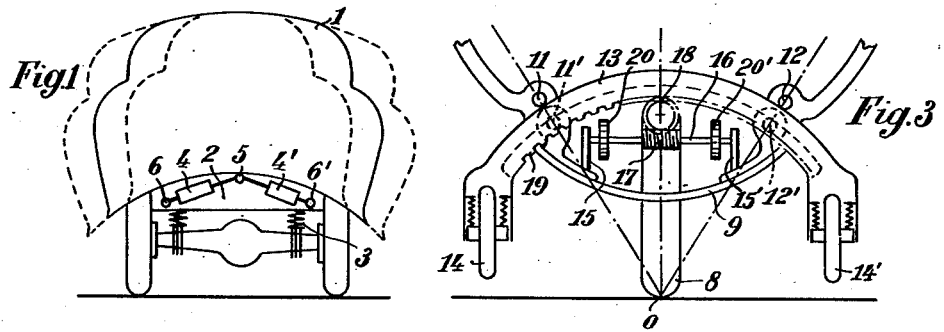
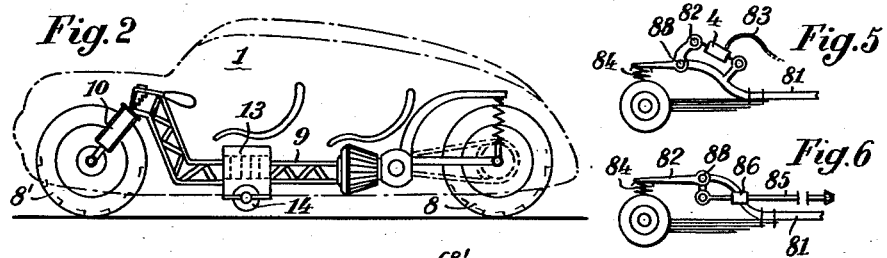
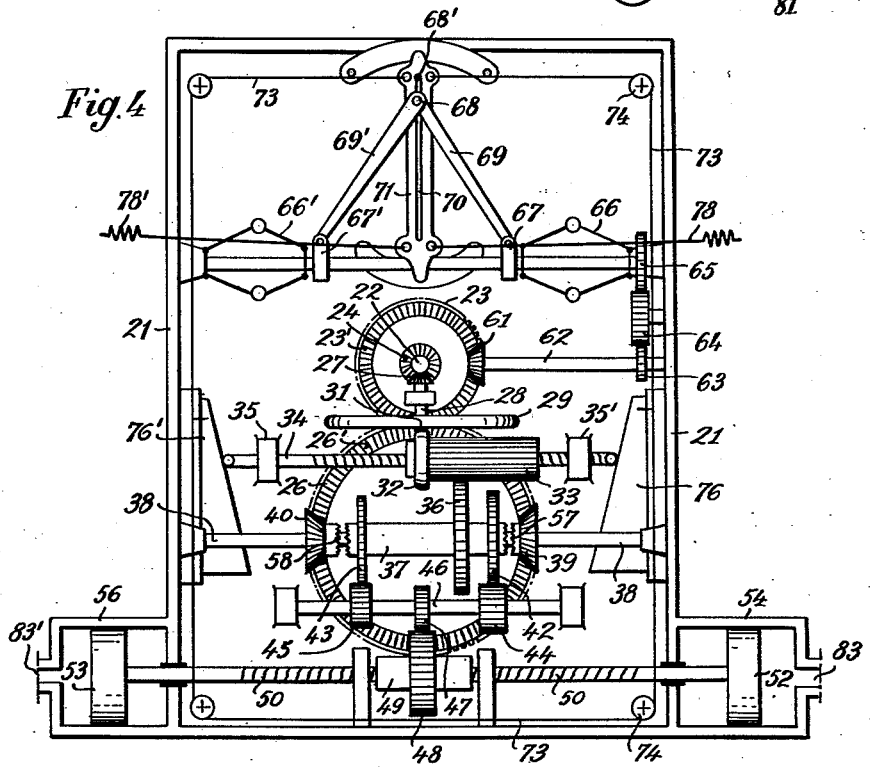
INVENTOR.
FEDERICO ZAPELLONI
BY

United States Patent Office 2,815,960
Patented Dec. 10, 1957

2,815,960

DEVICE FOR NEUTRALIZING CENTRIFUGAL FORCE IN VEHICLES WITH TWO OR MORE WHEELS

Federico Zapelloni, Rome, Italy

Application November 24, 1953, Serial No. 394,094

Claims priority, application Italy November 24, 1952

5 Claims. (Cl. 280—112)

The present invention relates to balancing devices for motor vehicles when moving along a curved path, for increasing the safety thereof.

Fast vehicles, when running through a curve, are affected by centrifugal force to a greater or lesser extent depending on whether they have two or more wheels, but in any case the action of centrifugal force is such as to make it dangerous to run into a curve at high speeds.

In vehicles having more than two wheels, centrifugal force tends to overload the outside wheels and to push passengers outwards; in two-wheel vehicles this outward push is not felt because the whole vehicle leans toward the center of the curve, but there is still the danger of swerving on wet or slippery surfaces. In effect, it is this danger of swerving and the need for jumping clear of the machine in case of an emergency which makes it impossible to provide a body to protect the passenger or passengers from the weather, and at the same time to effectively streamline the vehicle.

It is an object of this invention to provide means facilitating the construction of an automatic or semi-automatic device which, in multi-wheeled vehicles, slants the suspended part of the body towards the center of the curve, before the effect of centrifugal force makes the body slant in the opposite direction.

The same device, when applied to two-wheeled vehicles, maintains at a constant height above the ground, even when the vehicles lean in curve, two wheels fitted laterally at the end of an arc of a circle centered on the line formed by the two normal wheels on the ground.

Under these circumstances, the two-wheeled vehicle can be fitted with a real body or cover.

The mechanical device which actuates the apparatus described above is powered by the vehicle's propeller shaft, and is linked to the steering assembly, in such a way that both the speed of the vehicle and the radius of the curve enter into determining the extent of its action.

The detailed description of the device will be more clearly understood having reference to the accompanying drawing showing several preferred embodiments of the invention, wherein:

Fig. 1 represents schematically a four-wheel vehicle fitted with the device in accordance with the invention;

Fig. 2 represents a side view of an embodiment of the invention applied to a two-wheeled vehicle;

Fig. 3 is a detail view showing the arc of Fig. 2 which carries the auxiliary wheels;

Fig. 4 is a schematic representation of the device which controls the balancing organs;

Figs. 5 and 6 represent the manner of applying to a four-wheel vehicle the balancing organs in the case of operation by fluid or mechanical drive.

With special reference to Fig. 1 the body 1 of the four-wheeled vehicle is mounted slidably upon a system of arc slides 2 which, in turn, are mounted on the vehicle frame with interposed suspension organs 3. Two cylinders 4, 4' located approximately at a tangent to the arc slides 2 are fitted with piston stem ends converging into pivot 5 fixed to the center of the body, while the opposite ends of cylinders 4 are pivoted upon the frame.

It is evident that when fluid is forced under pressure into either cylinder 4 or 4' and allowed to flow out of the other, a corresponding slant of the body will be obtained.

Figs. 2, 3 and 4 relate to a similar application to a vehicle with two aligned wheels. In Figs. 2 and 3, this vehicle is represented at fitted with a body 1. The vehicle wheels 8 and 8' are connected by a frame 9 which carries a conventional steering assembly or mechanism 10 at its front end. Frame 9 is fitted with brackets in which rotate two pairs of rollers 11—11' and 12—12' between which slides, through slots in the frame, an arc-shaped yoke 13, at the free ends of which are mounted two wheels 14—14' which are the vehicle's auxiliary wheels.

Two bearings 15—15', fixed to the lower end of the frame, support a shaft 16 which carries in its central part a worm gear 17, which meshes with a helical gear 18 which, in turn, drives a rack 19 fastened to the yoke 13.

Shaft 16 is driven to perform a rotary motion via operable means in the form of two wheels 20—20' for the purpose of slanting yoke 13 in respect to the center plane of the vehicle whenever the latter, in running through a curve, assumes a leaning position. Therefore, the slant of yoke 13 at any time shall be such that wheels 14—14' are maintained an equal distance from the ground, on either side of the vehicle even when the latter assumes a leaning position.

Both the slanting of the body in Fig. 1, and the movement of yoke 13 are obtained by means of the device which is represented as an example in Fig. 4. Into housing 21 enters a shaft 22 connected with the vehicle's propeller shaft. Shaft 22 carries a gear 23 and a bevel gear 24, meshing respectively with gear 26 and bevel gear 27, on whose shaft 28 is fastened a flat disc 29, on the center of whose lower face is machined a small cavity 31 into which fits the circumference of a friction wheel 32 fixed to a sleeve 33 which has teeth on the outside, while on the inside thereof threads are provided to engage threaded shaft 34, mounted slidably but not rotatably in bearings 35—35'.

With toothed wheel 33 meshes a gear 36 fixed to a drum 37 mounted idle on shaft 38, upon which are also mounted idle two bevel gears 39 and 40 which mesh in two diametrical points of bevel gear 26' incorporated into gear 26 referred to above.

On drum 37 are fastened two other gears 42 and 43 which mesh with gears 44 and 45 mounted on counter-shaft 46 upon which is fastened also gear 47 which meshes with gear 48 mounted on a sleeve 49 threaded internally and engaged on screw shaft 50 which when gear 48 rotates, constitutes operable means and shifts in either direction pistons 52 and 53 into cylinders 54 and 56, since shaft 50 is prevented from rotating by appropriate keys. Cylinders 54, 56 are connected via conduits 83, 83' to cylinders 4, 4' respectively.

As long as friction wheel 32 remains in the position shown in Fig. 4, with its apex in the cavity 31 of flat disc 29, the device described remains inactive, even with disc 29 in rotation. But upon shifting wheel 32, for instance together with threaded shaft 34 in either direction, wheel 32 will be driven into rotation frictionally by disc 29 and will return to center position after having made a number of revolutions proportional to the distance by which threaded shaft 34 was shifted. The shifting of friction wheel 32 controls, for instance by means of a relay (not shown in the drawing) or of any other known means, the locking of either clutch means 57 or 58 connecting respectively gears 39 and 42 or gears 40 and 43, with the result that pistons 52 and 53 will be moved toward the right or left, because gears 39 and 40 rotate in opposite directions. Furthermore, as the latter are driven by gear 26, which is operatively connected with the vehicle's propeller shaft, the device described will act as a real servo-motor when considerable pressures are required of pistons 52 and 53.

The shifting of threaded shaft 34 can be manually or automatically controlled. In the latter case, a bevel gear 23' incorporated into gear 23 meshes with spur gear 61 fastened on shaft 62, on which is fastened also a gear 63 which, through gears 64 and 65, imparts rotation to a governor with centrifugal masses 66 and 66', which will shift collars 67 and 67' by a distance proportional to the speed of the propeller shaft, i. e. the speed of the vehicle.

To the two collars are pivoted the legs of a scissors-like device 69—69' whose fulcrum pivot 68 is slidable into slot 70 of a lever 71. This fulcrum pivot also slides in a fixed slot (not shown in the drawing), so that lever 71 will also move around the movable fulcrum provided by fulcrum pivot 68.

To the end 68' of lever 71 are fastened the ends of an endless belt 73 trained over sheaves 74. This belt carries wedge blocks 76—76', whose sloped faces push against the ends of threaded shaft 34.

Now, as lever 71 is connected to the vehicle's steering assembly, and has its fulcrum in movable point 68, the movement of belt 73 in either direction shall be in proportion to the steering angle, but also to the speed, because the legs of the scissors-like device move fulcrum pivot 68 away from the location 68' where the belt is fastened. The movement of threaded shaft 34 shall therefore be likewise proportional to the speed of the vehicle and to the steering angle.

Preferably, lever 71 shall be connected to the steering gear by means of an elastic linkage, such as for instance links 78 and 78'. This elastic linkage may be adjustable in order to maintain the vehicle in a vertical position also when running on roads having an appreciable lateral slope.

Fig. 5 shows how the balancing organs according to the invention can be applied to a vehicle. Slides 81 of the frame terminate at their ends in a lever 82 with fulcrum pivot 88, one arm of which rests on suspension organs 84, while the other drives cylinder stem 4. When, by means of the device shown in Fig. 4, the fluid under pressure acts upon lever 82, the latter being unable to further compress the suspension organs because the weight has not increased, will lift the frame on the outside of the curve, and the conditions described above will occur.

Fig. 6 shows the same device when, instead of a pressure cylinder, mechanical means are used, such as shaft 85 which threadedly engages more or less deep into threaded sleeve 86. In this case, shaft 85 could be driven directly by shaft 50, which will be threaded, and in turn is driven by gear 48.

To shift yoke 13 in two-wheeled vehicles, the same device shown in Fig. 4 can be used, with the difference that shaft 50 will not be threaded, and will drive shaft 16 of Fig. 3. Furthermore if, because of the small resistance involved, no servo-motor were needed, then gears 26—39 and 40 of Fig. 4 may be inactuated or eliminated.

Having thus described the invention, what is claimed as new and desired to be secured by Letters Patent, is:

1. In a balancing device for increasing the safety, when running through a curve, of motor vehicles having a steering mechanism; disc means revolving at a speed proportional to the speed of said vehicle and provided with a central cavity, friction wheel means extending transversely of said disc means and engaging the latter through said cavity, shaft means threadedly engaging said friction wheel means, toothed sleeve means operatively connected with said friction wheel means, means operatively connected with said shaft means and connectable with the steering mechanism of said vehicle for shifting said shaft means axially in proportion to the steering angle of said vehicle, gear means engaging said toothed sleeve means, longitudinally displaceable drum means carrying said gear means, a pair of spaced clutch means on said drum means and displaceable with the latter upon displacement of said shaft means, second and third gear means spaced from each other and disposed freely about said drum means, said second and third gear means being selectively cooperable with said drum means for rotation therewith, and operable means operatively connected with said second and third gear means and selectively actuatable thereby for effecting balancing of said vehicle.

2. In a device according to claim 1, including a pair of centrifugal governor means rotatable at a speed proportional to the speed of said vehicle, a pair of legs operatively connected with said pair of governor means, respectively, for displacement with respect to each other upon actuation of said governor means, lever means having a pair of ends and a slot, pivot means connecting said legs and extending into said slot of said lever means to thereby form a fulcrum for the latter, one of said ends of said lever means being operatively connected with said steering means for angular displacement of said lever means about said fulcrum upon actuation of said steering means, and belt means operatively connecting the other end of said lever means with said threaded shaft means for displacing the latter upon actuation of said steering means.

3. In a device according to claim 2, further including elastic linkage means connecting said one lever end with said steering means.

4. In a device according to claim 1, including a pair of wheels operatively connected with said vehicle for rotation at a speed proportional to the speed of said vehicle, said wheels rotating at the same speed in opposite directions and being selectively engageable by said pair of clutch means, respectively, upon longitudinal displacement of said drum means.

5. In a device according to claim 1, said operable means including piston means, said operative connection between said piston means and said second and third gear means including a further shaft extending parallel to said drum means, fourth and fifth gear means on said further shaft and engaging said second and third gear means, respectively, sixth gear means on said further shaft, and screw shaft means operatively connected with said sixth gear means for longitudinal displacement upon actuation of the latter, said screw shaft means being operatively connected with said piston means for actuation of the latter.

References Cited in the file of this patent

UNITED STATES PATENTS

| 2,260,102 | Freret | Oct. 21, 1941 |
| 2,490,719 | Tank | Dec. 6, 1949 |

FOREIGN PATENTS

| 570,108 | Germany | Feb. 11, 1933 |
| 487,786 | Great Britain | June 23, 1938 |